July 19, 1960     F. G. SCHWEISTHAL     2,945,508
PRESSURE RELIEF VALVE
Filed April 26, 1957
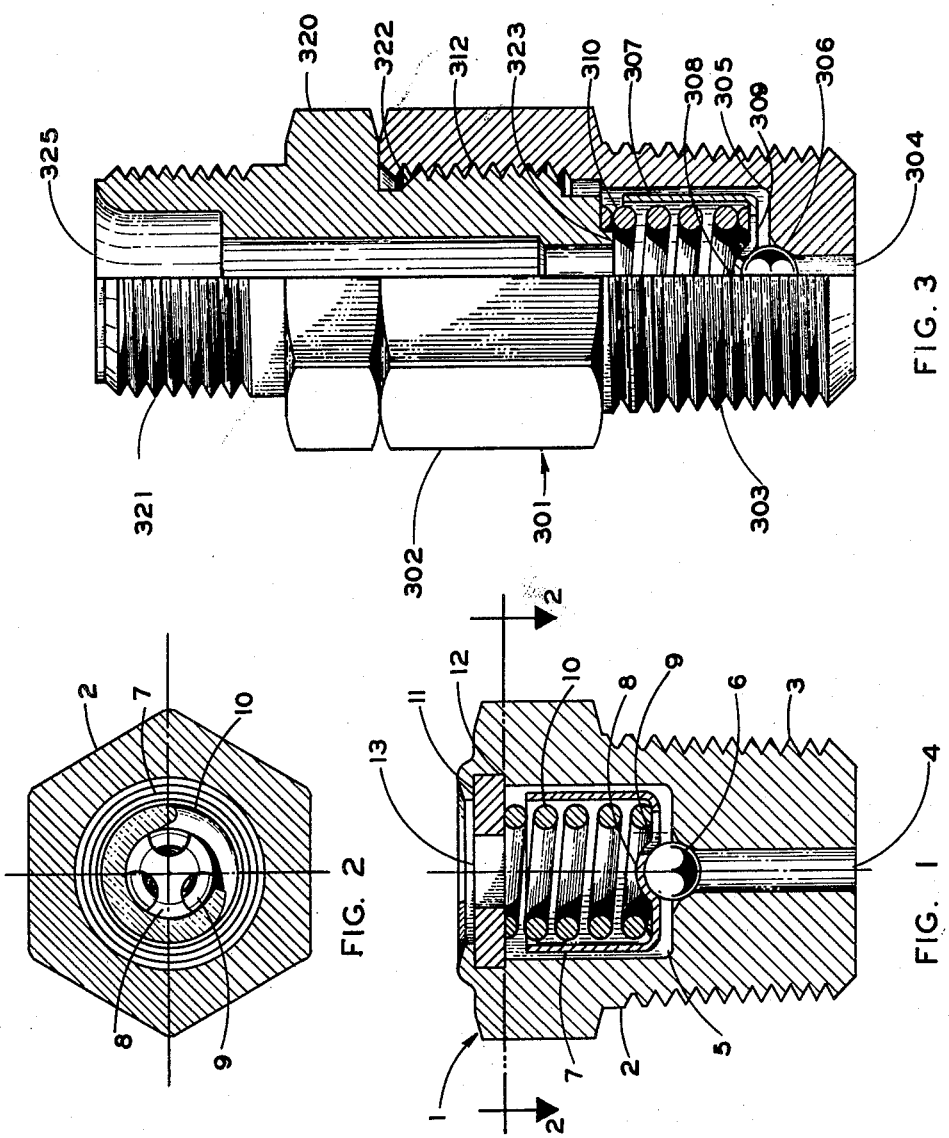
INVENTOR
FREDERICK G. SCHWEISTHAL
BY John C. Black
ATTORNEY

2,945,508

PRESSURE RELIEF VALVE

Frederick G. Schweisthal, Skokie, Ill., assignor to Stewart-Warner Corporation, Chicago, Ill., a corporation of Virginia Filed Apr. 26, 1957, Ser. No. 655,324

1 Claim. (Cl. 137—515)

This invention relates to an improved lubrication pressure relief valve.

It is an object of the present invention to provide a more accurate, reliable, yet inexpensive, pressure relief valve.

Another object is to provide in an axial flow pressure relief valve unrestricted fluid flow.

Another object of the present invention is to provide in a pressure relief valve a ball check having a ball guide means which neither interrupts axial flow nor affects accuracy.

Another object of the present invention is the provision in a spring biased pressure relief valve of means preventing damage to the spring and further preventing inaccuracy due to spring buckling.

A further object is the provision of an internal, floating ball guide means whereby sealing problems are alleviated.

A feature of the present invention is the provision of abutment surfaces for a cup-shaped element and said spring arranged such that said cup-shaped element engages its abutment surface in the fully open position of the valve before the spring has been fully compressed to prevent further compression of the spring, whereby damage thereto is prevented.

Another feature of the present invention is the provision in an axial flow pressure relief valve of a ball check, of a cup-shaped element having a concave depression in the base thereof to receive and guide the ball check and having apertures in said base for axial free fluid flow and of a helical compression spring coaxial with and in close proximity to the peripheral side of said cup-shaped element to prevent lateral buckling of the spring.

Further objects and features will be evident upon a perusal of the following disclosure in which:

Fig. 1 shows an elevation view in section of one form of the invention;

Fig. 2 is a section along line 2—2 of Fig. 1;

Fig. 3 shows an elevation view partially in section of a modified form of the invention.

With reference to Fig. 1, the valve 1 comprises: a body 2 formed from hexagonal stock with a necked down cylindrical lower portion threaded at 3 and having an axial bore 4 and counter bore 5; a ball check 6; a cup-shaped element 7 of thin sheet metal having a concave depression 8 and a pair of apertures 9 in the central portion of the base thereof; a helical compression spring 10 disposed in close proximity to the inner peripheral wall of element 7 and having the extreme ends thereof ground flat; and an annular retaining washer 11 disposed in a second counter bore 12 at the upper extremity of the body 2. The top surface of the body 2 is curled over washer 11 to hold it rigidly in place, washer 11 providing upper abutment surfaces for the spring 10 and the element 7. The concave depression 8 provides a guide means for the ball check 6; and because they are located radially inwardly from spring 10, the apertures 9 provide for nonrestricted flow of fluid from bore 4 into the element 7 in the open position of the valve from which element 7 the fluid can freely flow through the axial aperture 13 in washer 11. If the apertures 9 were located radially outwardly from the spring 10 as is the practice in present commercial ball check valves, compression of the spring has a tendency to seriously restrict flow therethrough. The flat surfaces at the extremities of spring 10 provide for an even distribution of forces on the base of element 7 and on the lower surface of washer 11 reducing the tendency of spring 10 to buckle laterally under compression. Because the outer periphery of the spring 10 is in close proximity to the inner peripheral wall of element 7, lateral buckling of the spring 10 is effectively prevented, whereby inaccuracy of response of the valve to a predetermined opening pressure is greatly reduced and whereby gradual change in spring rate due to damage from buckling is eliminated. The element 7 is made of a very thin sheet metal stock so that its weight will have little or no effect on the operation of the ball check valve. The distance between the lower surface of washer 11 and the upper end of element 7 in the closed position of the valve is made such that element 7 will engage washer 11 in the open position of the valve before spring 10 fully compresses, thereby preventing damage to and change of spring rate of spring 10.

The modification shown in Fig. 3 is substantially the same as that shown in Figs. 1 and 2 except for an additional spring retaining means and except that it is provided with a fitting connection whereby fluid discharged through the valve can be directed through a hose to a fluid container rather than being spilled into the atmosphere as would be the case with the embodiment shown in Fig. 1. Since the operation and function of the operating components of Fig. 3 are substantially identical to those of Fig. 1 they will be described only briefly. The valve 301 has a body 302 formed from hexagonal stock with a necked down lower portion threaded at 303. The body 302 has an axial bore 304, a counter bore 305 and an internally threaded inner wall 312 at the upper end thereof. A ball check 306, a cup-shaped element 307 with a concave ball guide depression 308 and central apertures 309, and a helical compression spring 310 are provided. A screw 320 formed from hexagonal stock having necked down upper and lower portions 321 and 322, respectively, is provided with an external thread for threading into the threaded portion 312 of body 301. Said screw 320 has an axial passageway 325 for free fluid flow and, at its extreme lower end, has an annular projection 323 for retaining the upper end of spring 310 in position. The bottom surface of screw 320 provides abutment surfaces for spring 310 and element 307 in much the same manner as the lower surface of washer 11 (Fig. 1) provided abutment surfaces for spring 10 and element 7. The upper necked down portion 321 of screw 320 is threaded to receive a conventional hose coupling.

It will be noted that the spring can be placed surrounding the cup-shaped element to accomplish the same result provided that the base of the cup-shaped element is provided with an exterior flange to provide a bearing surface for said spring.

While there has been described what is believed at present to be the preferred forms of the invention it will be apparent that various changes and modifications may be made; and it is contemplated to cover in the appended claim all such changes and modifications which fall within the true spirit and scope of the invention.

What is claimed is:

An axial flow fluid pressure relief valve comprising a body assembly having an axial chamber therein, an axial inlet and an axial outlet for said chamber, a ball check in the chamber, structure in said body assembly defining a seat for the ball check at the inlet end of the chamber, an axially elongated thin-wall cup-shaped element in the chamber downstream of the ball check having a base normal to the axis of the chamber and having a concave depression in the central portion of the base for receiving and guiding the ball check, the outer peripheral wall of the element being spaced from the adjacent peripheral wall of the chamber, an axially elongated helical spring disposed within the element and engaging the base thereof, enlarged aperture means in the base of the element positioned at least partially radially inwardly from the spring, and structure in the body assembly surrounding the outlet defining abutment surfaces normal to the axis of the chamber for the end of the element opposite its base and for the spring end adjacent the said end of the element whereby the spring normally urges the element away from its abutment surface to seat the ball check, the ends of the spring being flat in planes perpendicular to the axis of the chamber and the peripheral surfaces of the spring and element facing each other being closely adjacent to maintain the element substantially coaxial with the chamber axis and spaced from the chamber wall during movement of the element to and from its ball check seating position, the axial length of the element being substantially greater than the axial length of the spring when fully compressed so that in the open position of the ball check the element engages its abutment surface prior to full compression of the spring, whereby the force of the spring resisting opening movement of the ball check is substantially constant and accurate over a long period of use.

References Cited in the file of this patent

UNITED STATES PATENTS

| | | |
|---|---|---|
| 543,773 | Massey | July 30, 1895 |
| 1,694,626 | Roberts | Dec. 11, 1928 |
| 1,913,664 | Finger | June 13, 1933 |
| 2,431,769 | Parker | Dec. 2, 1947 |
| 2,546,475 | Rizzo | Mar. 27, 1951 |

FOREIGN PATENTS

| | | |
|---|---|---|
| 421,921 | France | Jan. 5, 1911 |
| 227,215 | Great Britain | Jan. 15, 1925 |
| 731,028 | Great Britain | June 1, 1955 |